(12) United States Patent
Welz

(10) Patent No.: US 6,726,241 B2
(45) Date of Patent: Apr. 27, 2004

(54) COLD GAS GENERATOR

(75) Inventor: Siegfried Welz, Fellbach (DE)

(73) Assignee: Welz Industrieprodukte GmbH, Fellbach (DE)

( * ) Notice: Subject to any disclaimer, the term of this patent is extended or adjusted under 35 U.S.C. 154(b) by 0 days.

(21) Appl. No.: 10/248,209

(22) Filed: Dec. 27, 2002

(65) Prior Publication Data

US 2003/0137134 A1 Jul. 24, 2003

Related U.S. Application Data

(63) Continuation of application No. PCT/EP01/06992, filed on Jun. 21, 2001.

(30) Foreign Application Priority Data

Jun. 29, 2000 (DE) .......................... 100 31 749

(51) Int. Cl.[7] .............................................. B60R 21/26
(52) U.S. Cl. .......................................... 280/737; 137/69
(58) Field of Search ................................ 280/736, 737, 280/741, 742; 137/68.19, 68.23, 69

(56) References Cited

U.S. PATENT DOCUMENTS

| 3,095,901 A | * | 7/1963 | Larson et al. ................. 137/522 |
| 3,788,596 A | | 1/1974 | Maeda .......................... 251/69 |
| 4,203,616 A | | 5/1980 | Okada .......................... 280/737 |
| 4,289,327 A | * | 9/1981 | Okada .......................... 280/737 |
| 4,771,914 A | * | 9/1988 | Kaneda et al. ................. 222/3 |
| 5,458,368 A | * | 10/1995 | Cermak ....................... 280/737 |
| 5,582,806 A | * | 12/1996 | Skanberg et al. ............. 422/305 |
| 6,206,420 B1 | | 3/2001 | Skanborg et al. ............. 280/737 |
| 6,217,065 B1 | * | 4/2001 | Al-Amin et al. ............. 280/737 |
| 6,247,725 B1 | | 6/2001 | Moller ........................ 280/737 |

FOREIGN PATENT DOCUMENTS

DE          22 37 461        2/1974

* cited by examiner

Primary Examiner—Paul N. Dickson
Assistant Examiner—David R. Dunn
(74) Attorney, Agent, or Firm—Gudrun E. Huckett

(57) ABSTRACT

A cold gas generator for an airbag system has a storage device filled with a gas under pressure and provided with a gas outlet opening. A thin-walled sealing disk is provided which, in a rest state, seals pressure-tightly the gas outlet opening. A support device supports the sealing disk against a gas pressure of the gas acting on the sealing disk in a pressure direction. A triggering device acts on the support device. The support device has a pressure plate resting against the sealing disk and a support lever supporting the pressure plate and the sealing disk. The pressure plate and the support lever are configured as separate parts. A bearing supports the support lever such that the support lever receives forces in the pressure direction and is force-free transversely to the pressure direction. The triggering device acts on the support lever so as to cause pivoting about the bearing.

25 Claims, 2 Drawing Sheets

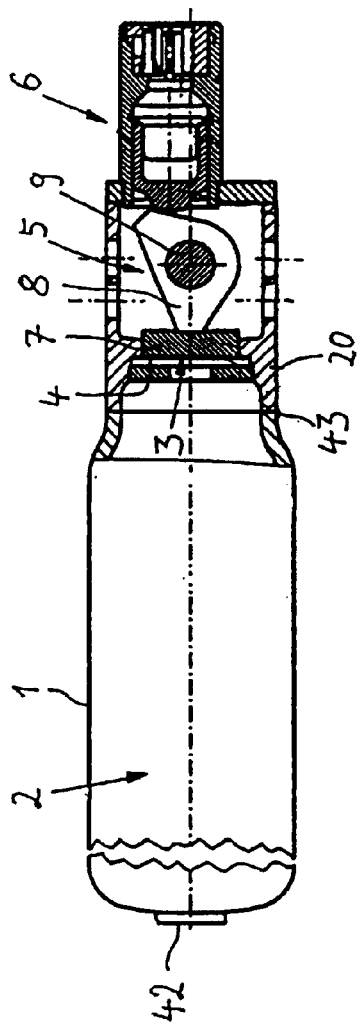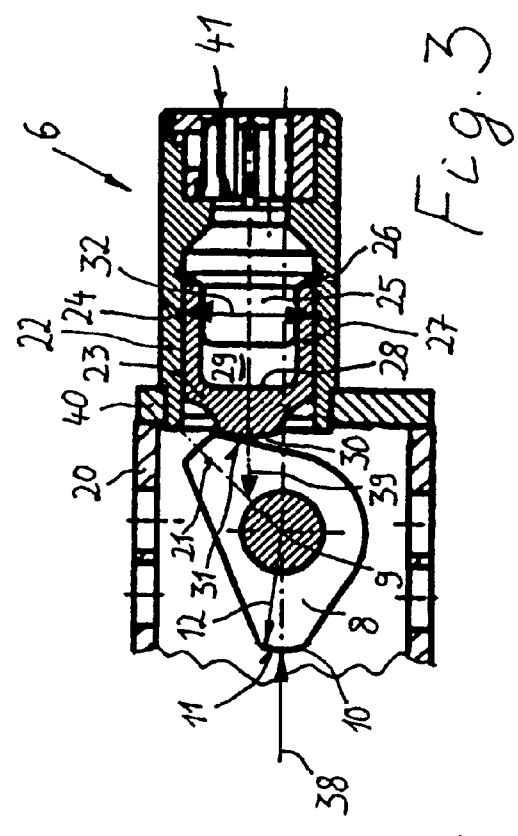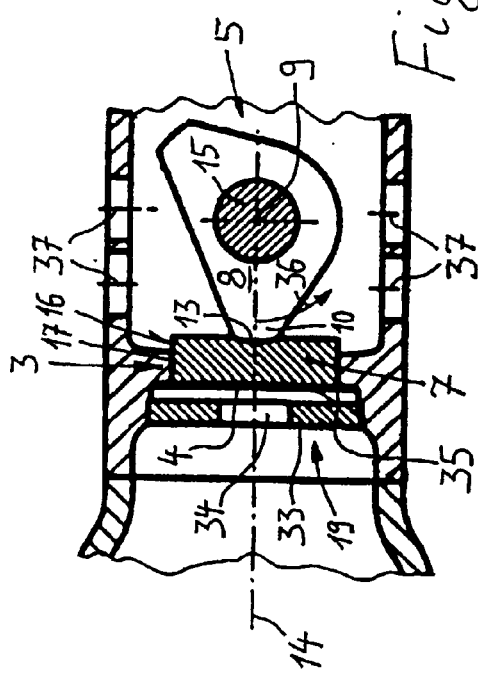

COLD GAS GENERATOR

CROSS REFERENCE TO RELATED APPLICATIONS

This is a continuation of International Application PCT/EP01/06992 with an international filing date of Jun. 21, 2001, not published in English under PCT Article 21(2), and now abandoned.

BACKGROUND OF THE INVENTION

1. Field of the Invention

The invention relates to a cold gas generator for an airbag system comprising a storage device filled with a gas under pressure; a gas outlet opening which in the rest state is pressure-tightly closed by a thin-walled sealing disk; a support device for supporting the sealing disk against the gas pressure acting on it; and a triggering device for affecting the support device, wherein the support device comprises a pressure plate resting against the sealing disk and a support lever supporting the pressure plate as well as the sealing disk.

2. Description of the Related Art

Known cold gas generators have a storage device in which the gas is stored at ambient temperature under high pressure for filling an airbag, when needed. In the rest state, a gas outlet opening is closed in a gas-tight way so that the gas pressure is maintained over the service life of the cold gas generator. A control device which is activated in case of an accident produces a signal which actuates the triggering device for opening the gas outlet opening. The gas stored in the storage device can then flow through the gas outlet opening and a correlated supply path into the folded airbag. The airbag is inflated whereby the gas expands to the desired filling pressure because of the correlated volume increase. The desire for a light-weight construction in the automobile industry as well as for improved safety measures with optionally a plurality of airbags and cold gas generators has resulted in the demand that they be constructed smaller and lighter, and have a more reliable function. The small size results in a high storage pressure of the gas in the storage device which leads to complex requirements in particular in the area of the gas outlet opening and the triggering device. On the one hand, the closure of the gas outlet opening must be configured such that it withstands high gas pressure while sealing it permanently gas-tightly even with respect to diffusion processes. Moreover, the triggering mechanism must be configured such that an accidental erroneous triggering is prevented and a controlled triggering with an energy expenditure as little as possible can take place.

In this connection, different configurations are known from German patent application 195 40 61 8 A1 in which the gas outlet opening is closed by a gas-tight film. The gas tight film is sized such that by itself it cannot withstand the pressure force of the filled-in gas. In the rest state, a support device supports the sealing film against the gas pressure acting on it. The support device has a pressure plate resting against the sealing film and also comprises a support element. The pyrotechnical charge acts, when needed, onto the support device such that its support action is eliminated. The gas pressure then destroys the sealing film so that the stored gas can be released in order to fill an airbag.

In the aforementioned prior art reference different configurations of the support device are illustrated in which the support device is a unitary part and is plastically deformed by the pyrotechnical charge such that its support action is eliminated. For supporting the sealing film against high gas pressure the support device must be sized to be correspondingly strong. This has the result that for its plastic deformation a large amount of energy must be provided by the pyrotechnical charge.

In one variant the pressure plate is supported by an elbow lever whose elbow joint is angled and is supported against the pyrotechnical charge. In the triggering situation, the pyrotechnical charge must first stretch the elbow joint against the gas pressure acting on it which requires a high energy expenditure. The permanent support of the elbow joint on the pyrotechnical charge prevents maintenance and inspection work. Minimal mounting tolerances can result in an accidental tearing of the sealing film.

In a further variant, the support plate is configured as a unitary part of the support element. For opening the gas outlet opening, the pyrotechnical charge acts laterally on it wherein the support device carries out a pivot movement. When carrying out this pivot movement, the edge of the pressure plate facing the triggering device must be lifted against the sealing film and the gas pressure acting on it before triggering can occur. This also requires a correspondingly high energy expenditure. The illustrated embodiments are sensitive with regard to tolerances in the area of the support and of the triggering device. Minimal movements can result in an accidental tearing of the sealing film.

SUMMARY OF INVENTION

It is an object of the present invention to provide a cold gas generator with improved reliability and reduced actuation energy.

In accordance with the present invention, this is achieved in that the pressure plate and the support lever are configured separately from one another, in that the support lever is supported in a pivotable way on a bearing so as to receive forces in the pressure direction and to be force-free in a direction transverse thereto, and in that the triggering device acts on the support lever so as to pivot it about the bearing.

It is thus suggested to close the gas outlet opening with a sealing disk in a pressure-tight way and to support the sealing disk in the rest state on a support device which is comprised of a pressure plate resting against the sealing disk and a separately configured support lever. The support lever is supported on the bearing so as to be pivotable and receive forces in the pressure direction while being force-free in a direction transverse thereto. The corresponding triggering mechanism is configured such that in the release situation the support lever pivots about its bearing. With this configuration, the triggering device in the rest state is not loaded by the support device. Mounting tolerances of the triggering device have no effect on the support action of the support device. With the above described bearing and the type of actuation of the support lever, its actuation does not result in a lifting of the pressure plate or of the sealing disk counter to the gas pressure acting thereon. For the actuation to take place, only a minimal energy level for overcoming the occurring frictional forces is required. As a result, the triggering device can be small which, in addition to weight and space savings, also results in a reduction of the released amount of pollutants, particularly in the case of employing a pyrotechnical charge.

The pivotable end of the support lever has advantageously a rounded portion whose radius matches in particular approximately the spacing of the pivotable end from the bearing. In this way, the support lever can carry out a certain pivot stroke which leaves the support action unchanged.

This enables generous positional tolerances for the support lever without impairing its support action; this contributes to the prevention of accidental erroneous triggering. Advantageously, a corresponding rounded recess is provided on the pressure plate and is engaged by the rounded pivotable end of the support lever. This provides a safe guiding and mutual adjustment.

A static gas pressure acts on a closed opening perpendicularly to its opening plane. A center axis of the opening extending perpendicularly to the opening plane and positioned at the center of gravity of the surface area of the opening therefore also defines the position and alignment of the resultant pressure force. By arranging the bearing on the center axis of the opening of the gas outlet opening, the resultant pressure force is oriented toward the bearing so that unsymmetrical loading of the support device is prevented; this contributes to a reduction of the triggering energy. Another contribution to the reduction of triggering energy is made by the configuration of the bearing of the support lever as a shaft journal by which the resultant frictional forces and, as a result of this, the required actuation energy can be kept minimal.

In an expedient configuration the pressure plate is fitted into the gas outlet opening approximately without play in the radial direction relative to the opening axis. In this way, a play-enabled movability of the pressure plate in the radial direction and the risk of damaging the sensitive sealing disk correlated therewith are avoided. Advantageously, the gas outlet opening and the pressure plate have approximately axis-parallel peripheral walls so that the pressure plate is guided about a defined axial stroke while avoiding tilting. This contributes to a precisely defined triggering process. By avoiding a tilting movement, certain axial position tolerances of the pressure plate are also permissible in the rest state without the risk of an accidental bursting of the sealing disk. Moreover, the pressure plate with its comparatively great thickness and gap-free fitting provides a certain sealing action.

In particular for an areal connection of the pressure plate with the sealing disk leakage by gas diffusion is prevented because the sealing disk is configured with a thin wall so as to extend only linearly along the peripheral wall of the pressure plate. The area of the thin-walled configuration of the sealing disk with a correspondingly high gas diffusion rate is thus very small. Moreover, with this configuration a precisely defined line-shaped breakage point results in the sealing disk wherein, in the case of triggering, the pressure plate with the correlated connected sealing disk part is ejected. As result of this, the now open gas outlet opening a has a precisely defined geometry with correspondingly predeterminable flow properties. In this way, the cold gas generator and the airbag to be filled can be adjusted relative to one another with greater precision with regard to their construction; this contributes to the operational safety of the system.

For a precise matching of the flow behavior, a flow throttle is provided in the flow path of the gas, in particular, at the storage device side of the gas outlet opening. In this arrangement, in the rest state the complete static pressure acts on the gas outlet opening which enables a precise tearing or bursting of the sealing disk. After opening of the gas outlet opening, a flow process takes place according to which a reduced dynamic gas pressure through the flow throttle results.

In particular, in connection with helium as a gas in the storage device a series of advantages can be obtained. Helium has excellent flow properties which enable a connection of an airbag by a supply line of a corresponding length to the storage device. In this way, positioning of the storage device at a location remote from the airbag is possible which improves the mounting flexibility of the airbag system. As a result of the minimal dependency of helium on pressure and temperature, the filling pressure of the storage device can be selected such that, on the one hand, a safe filling of the airbag is possible at low ambient temperatures and, on the other hand, for example, in the case of intensive solar radiation, the gas pressure will not increase excessively so that an overloading of the airbag at high temperatures is prevented. Moreover, an airbag filled with helium has excellent damping properties so that the impact loading of a person to be protected and, in particular, the HIC factor (Head Injury Criterion) is reduced. The flow throttle prevents also a sudden inflation of the airbag and thus a possible overloading of the airbag material.

In an advantageous embodiment, a housing, particularly of a unitary (single part) construction is provided in which the gas outlet opening, the support device, and optionally also the flow throttle are arranged. The housing is expediently welded gas-tightly to the storage device. In this way, a precise alignment and support of the individual parts relative to one another is enabled by means of an excellently controllable manufacturing process. The unitary configuration of the housing also prevents possible displacement events as a result of high forces that are occurring. The housing, for example, can be welded in a cost-saving way onto the storage device only after a pre-mounting step.

Advantageously, the support lever has a pawl lever angled relative to the axis of the opening wherein the triggering device is displaced axis-parallel and laterally to the axis of the opening or bearing for acting on the pawl lever. By means of the pawl lever a deflection device is provided that for actuation of the pivotable end transverse to the pressure direction has an actuation direction parallel to the central axis of the opening. In this way, the triggering device can be arranged parallel to the axis of the opening so that over all an elongate narrow configuration of the cold gas generator is possible. This contributes to universal placement possibilities of the corresponding cold gas generator even in tight spaces in the vehicle. The slender configuration is further enhanced by a triggering mechanism having a longitudinally guided impact piston.

In contrast to pivoting or rotating systems, a slender configuration is also enabled as a result of the longitudinally displaceability of the piston. The impact piston is secured preferably in the receptacle by a clamping ring. The clamping ring acts as a mounting aid and secures the impact piston in its rest position without a support action being required by the support lever.

For generating a high energy density and, correlated therewith, minimal space and weight requirements for actuation of the impact piston a pyrotechnical charge is provided. The pyrotechnical charge is secured together with the impact piston in the receptacle and secured by a securing ring against sliding out. The securing ring is expediently elastically embodied so that in the case of ignition of the charge it can act as a seal. For an additional reduction of the space the impact piston comprises an interior piston chamber which is enclosed partially by a piston jacket and a piston bottom. The pyrotechnical charge projects into this piston chamber so that overall a compact configuration results.

The impact piston and the pawl lever can expediently be provided with a contact surface, respectively, angled in the rest state relative to one another. Upon impacting of the impact piston onto the slanted contact surface of the pawl lever, the pawl lever performs a pivot movement to such an extent that the two impact surfaces will reach a position in which they are in a plane adjacent to one another. In this state, the rotational movement of the pawl lever is braked so that it remains in a defined position without negatively affecting the outflow of the gas. In a further expedient configuration, the impact piston has a curved contact surface which in connection with the pivoting pawl lever can roll on it. In this way, overall the frictional losses are reduced which results in a further saving in regard to the energy requirements and thus also in a reduction of the size of the triggering device. In this connection it may be expedient to configure the contact surface of the impact piston smaller than the piston surface. By means of the relatively large piston surface a high piston force can be achieved. The comparatively smaller contact surface can even enable an improved movability of the support lever or of the pawl lever in the case of corresponding spatial conditions.

BRIEF DESCRIPTION OF DRAWINGS

FIG. 1 shows an overview illustration of a cold gas generator with its important components.

FIG. 2 is a detail view of FIG. 1 with details of the gas outlet opening.

FIG. 3 is a detail view of FIG. 1 with details of the triggering device.

DETAILED DESCRIPTION

Figure 4:
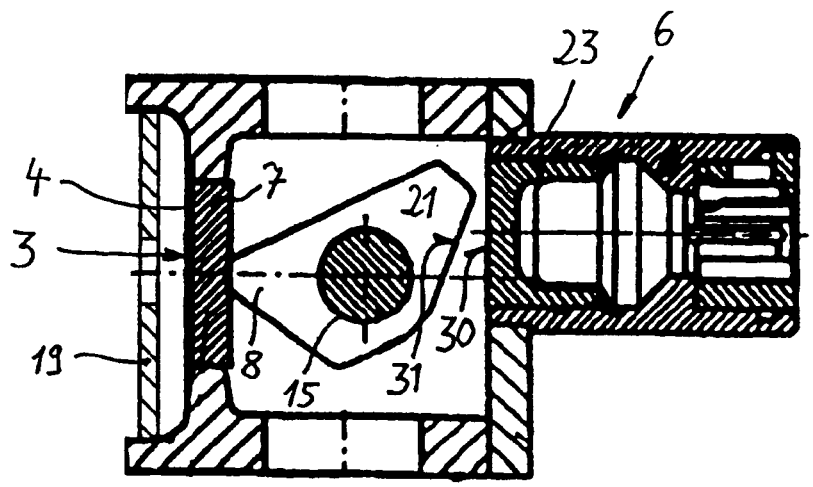
FIG. 4 is a variant of the triggering device of FIG. 1 and FIG. 3 with a plane contact surface of the impact piston.

FIG. 1 shows in an overview illustration a cold gas generator with a storage device 1 which is filled by a filling valve 42 with a gas 2 under high pressure. The gas 2 is helium but can also be any other suitable gas. The cold gas generator has a gas outlet opening 3 which is gas-tightly closed by a sealing disk 4. The sealing disk 4 is supported against the gas pressure acting on it by a support device 5. A triggering device 6 is provided which, when needed, acts on the support device 5 such that the support action of the sealing disk 4 is eliminated. By means of the pressure of the gas 2 the sealing disk 4 is destroyed so that the gas 2 can flow through the gas outlet opening 3 into the airbag (not illustrated) for filling it. The support device 5 comprises a pressure plate 7 resting against the sealing disk 4 and a support lever 8 which supports the pressure plate 7 as well as the sealing disk 4. The support lever 8, in turn, is supported on a bearing 9. The gas outlet opening 3 and the support device 5 are provided in a monolithic (single part) housing 20 which is welded by an annular welding seam 43 gas-tightly to the storage device 1.

FIG. 2 shows in an enlarged illustration details of the cold gas generator of FIG. 1 in the area of the gas outlet opening 3 having a central axis 14. The pressure plate 7 is fitted in the radial direction relative to the axis 14 of the opening without play into the gas outlet opening 3 wherein both peripheral walls 16, 17 are axis-parallel to the opening axis 14. The pressure plate 7 is areally connected with the sealing disk 4 so that together with the play-free fitting, at least in approximation, of the pressure plate 7 into the gas outlet opening 3 an annularly extending rated break-off location 35 is formed in the sealing disk 4. At the storage device side of the gas outlet opening 3 a flow throttle 19 in the form of a throttle plate 33 with a central throttle bore 34 is provided. The gas pressure force acting on the closed gas outlet opening 3 has a pressure direction extending along the opening axis 14 on which the bearing 9 in the form of an shaft journal 15 is arranged. The support lever 8 is supported in the direction of the opening axis 14 on the shaft journal 15 wherein its pivotable end 10 is force-free transversely thereto and is pivotable by the triggering device 6 (FIG. 1) in the direction of the arrow 36. An embodiment can be expedient in which the pressure plate 7 is supported with one end in a pivotable way and is secured off-center at the opposite end by a comparable support device 5. The pivotable end 10 of the support lever 8 is rounded and engages a corresponding rounded depression 13 of the pressure plate 7. In the unitary housing 20 four outflow openings 37 are provided via which the gas 2 (FIG. 1) can be guided in the triggering situation to the airbag to be filled.

FIG. 3 shows a further detail illustration of the cold gas generator of FIG. 1 in the area of the triggering device 6. It is comprised of a receptacle 22 in which an impact piston 23 is longitudinally guided in an actuation direction 39. The impact piston 23 is secured against sliding in the receptacle 22 by means of a circumferentially extending clamping ring 24. The impact piston 23 forms with its piston jacket 27 and its piston bottom 28 an interior piston chamber 29 into which a pyrotechnical charge 25 projects. The charge 25 is secured sealingly in the receptacle 22 by an elastic securing ring 26. At the end of the impact piston 23 of the triggering device 6 electrical contacts 41 for igniting the pyrotechnical charge 25, when needed, are provided. The receptacle 22 is fastened in a fastening plate 40 which, in turn, is fastened on the housing 20. In the housing 20 the support lever 8 is pivotably supported on a bearing 9 such that the pressure force, acting on it in the pressure direction along the opening axis 14 (FIG. 2) as indicated by the arrow 38, acts on the bearing 9 without having a force component perpendicularly thereto in the pivot direction 36 (FIG. 2). The pressure force illustrated by the arrow 38 acts approximately centrally onto the pivotable end 10 of the support lever 8 which has a rounded portion 11 of a radius 12 which corresponds approximately to the spacing of the pivotable end 10 to the bearing 9.

On the side facing away from the pivotable end 10, the support lever 8 has a pawl lever 21 angled relative to the pressure direction 38 and onto which the triggering device 6 acts when needed. An arrangement may be expedient in which the triggering device 6 is arranged so as to act directly laterally on the pivotable end 10. Also, it can be expedient, that the pawl lever 21 is formed without an angled portion wherein the triggering device 6 with its actuation direction 39 is arranged at an angle to the pressure direction 38.

In the illustrated embodiment the actuation direction 39 is axis-parallel to the pressure direction 38 or to the axis 14 of the opening (FIG. 2) and laterally displaced thereto so that one lever arm follows the piston force acting on the pawl lever 21 in the actuation direction 39 about the bearing 9. The pawl lever 21 is positioned with its planar contact surface 31 on a curved contact surface 30 of the impact piston 23 substantially without force load in the rest position. As a result of the curvature of the contact surface 30 provided on the piston, it can roll along the planar contact surface 31 in the triggering situation. For supporting the free movability of the support lever 8 in the triggering situation, the contact surface 30 is smaller than the piston surface which is indicated by the double arrow 32.

FIG. 4 shows a variant of the arrangement of FIG. 3 in which the impact piston 23 is illustrated in the rest position and spaced relative to the pawl lever 21. The pawl lever 21 and the impact piston 23 have a planar contact surface 30, 31, respectively, arranged at an angle to one another.

Figure 5:
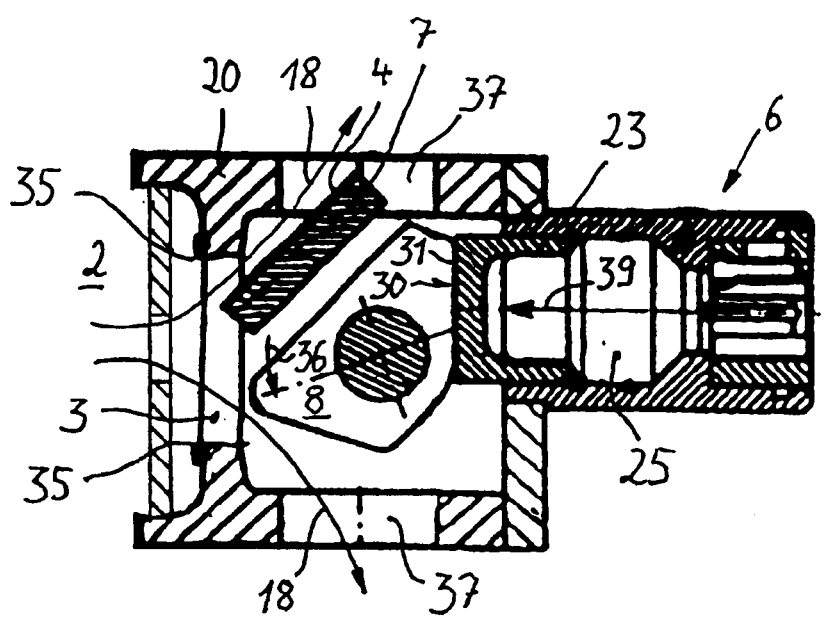
FIG. 5 shows the arrangement according to FIG. 4 with actuated triggering device and an open gas outlet opening.

In FIG. 5, the arrangement of FIG. 4 is shown in the triggered state in which the impact piston 23 has been moved forwardly in its actuation direction by igniting the pyrotechnical charge 25. Accordingly, the support lever 8 has carried out a pivot movement in the direction of arrow 36 wherein the two contact surfaces 30, 31 are flush with one another and a further rotation of the support lever 8 is braked. As a result of the pressure of the gas 2 the pressure plate 7 has been pressed with a partial portion of the sealing disk 4 out of the gas outlet opening wherein the sealing disk 4 is sheared off along an annular rated break-off location 35. The gas 2 exits along the flow path indicated by the arrows 18 through the gas outlet opening 3 and two outflow openings 37 arranged in the housing 20 in the direction of an airbag (not illustrated). In the flow path 18 of the gas 2, a flow throttle 19 is arranged which, in the illustrated embodiment, is arranged at the side of the storage device of the gas outlet opening 3. It can be expedient to configure the outflow openings 37 as a flow throttle 19 or to arrange one or several separate flow throttles 19 in supply lines (not illustrated) extending to the airbag.

While specific embodiments of the invention have been shown and described in detail to illustrate the inventive principles, it will be understood that the invention may be embodied otherwise without departing from such principles.

What is claimed is:

1. A cold gas generator for an airbag system, the cold gas generator comprising:
    a storage device (1) filled with a gas (2) under pressure and having a gas outlet opening (3),
    a thin-walled sealing disk (4) which, in a rest state, seals pressure-tightly the gas outlet opening (3);
    a support device (5) for supporting the sealing disk (4) against a gas pressure of the gas (2) acting on the sealing disk (4) in a pressure direction;
    a triggering device (6) configured to act on the support device (5);
    wherein the support device (5) comprises a pressure plate (7) resting against the sealing disk (4) and a support lever (8) supporting the pressure plate (7) and the sealing disk (4);
    wherein the pressure plate (7) and the support lever (8) are configured as separate parts;
    a bearing (9) supporting the support lever (8) such that the support lever (8) receives forces in the pressure direction and is force-free transversely to the pressure direction; and
    wherein the triggering device (6) acts on the support lever (8) so as to cause pivoting about the bearing (9).

2. The cold gas generator according to claim 1, wherein the bearing (9) is located on a center axis (14) of the gas outlet opening (3).

3. The cold gas generator according to claim 1, wherein the bearing (9) is a shaft journal (15).

4. The cold gas generator according to claim 1, wherein the pressure plate (7) is fitted into the gas outlet opening (3) so as to be substantially without play in a radial direction relative to the center axis (14).

5. The cold gas generator according to claim 4, wherein the gas outlet opening (3) and the pressure plate (7) have approximately axis-parallel peripheral walls (16, 17).

6. The cold gas generator according to claim 1, wherein the sealing disk (4) and the pressure plate (7) are connected areally to one another.

7. The cold gas generator according to claim 1, wherein a flow path (18) of the gas (2) in and out of the storage device has a flow throttle (19).

8. The cold gas generator according to claim 7, wherein the flow throttle (19) is arranged at a side of the gas outlet opening (3) facing the storage device.

9. The cold gas generator according to claim 1, comprising a housing (20) in which the gas outlet opening (3) and the support device (5) are arranged.

10. The cold gas generator according to claim 9, wherein the housing (20) is a single part housing.

11. The cold gas generator according to claim 9, wherein the housing (20) is welded gas-tightly to the storage device (1).

12. The cold gas generator according to claim 1, wherein the gas (2) is helium.

13. A cold gas generator for an airbag system, the cold gas generator comprising:
    a storage device (1) filled with a gas (2) under pressure and having a gas outlet opening (3),
    a thin-walled sealing disk (4) which, in a rest state, seals pressure-tightly the gas outlet opening (3);
    a support device (5) for supporting the sealing disk (4) against a gas pressure of the gas (2) acting on the sealing disk (4) in a pressure direction;
    a triggering device (6) configured to act on the support device (5);
    wherein the support device (5) comprises a pressure plate (7) resting against the sealing disk (4) and a support lever (8) supporting the pressure plate (7) and the sealing disk (4);
    wherein the pressure plate (7) and the support lever (8) are configured as separate parts;
    a bearing (9) supporting the support lever (8) such that the support lever (8) receives forces in the pressure direction and is force-free transversely to the pressure direction;
    wherein the triggering device (6) acts on the support lever (8) so as to cause pivoting about the bearing (9);
    wherein the support lever (8) has a pivotable end (10) provided with a rounder portion (11) having a radius (12) matching substantially a spacing of the pivotable end (10) from the bearing (9).

14. The cold gas generator according to claim 13, wherein the pressure plate (7) has a rounded recess (13) matching the pivotable end (10) of the support lever (8), wherein the pivotable end (10) engages the rounded recess (13).

15. A cold gas generator for an airbag system, the cold gas generator comprising:
    a storage device (1) filled with a gas (2) under pressure and having a gas outlet opening (3),
    a thin-walled sealing disk (4) which, in a rest state, seals pressure-tightly the gas outlet opening (3);
    a support device (5) for supporting the sealing disk (4) against a gas pressure of the gas (2) acting on the sealing disk (4) in a pressure direction;
    a triggering device (6) configured to act on the support device (5);
    wherein the support device (5) comprises a pressure plate (7) resting against the sealing disk (4) and a support lever (8) supporting the pressure plate (7) and the sealing disk (4);

wherein the pressure plate (7) and the support lever (8) are configured as separate parts;

a bearing (9) supporting the support lever (8) such that the support lever (8) receives forces in the pressure direction and is force-free transversely to the pressure direction;

wherein the triggering device (6) acts on the support lever (8) so as to cause pivoting about the bearing (9);

wherein the support lever (8) has a pawl lever (21) angled relative to the central axis (14) and wherein the triggering device (6) is displaced axis-parallel and laterally to the opening axis (14) so as to act on the pawl lever (20).

16. The cold gas generator according to claim 15, wherein the triggering device (6) comprises a receptacle (22) and an impact piston (23) longitudinally movably guided in the receptacle (22) for acting on the support lever (8).

17. The cold gas generator according to claim 16, wherein the impact piston (23) is secured by a clamping ring (24) in the receptacle (22).

18. The cold gas generator according to claim 16, wherein the triggering device (6) comprises a pyrotechnical charge (25) arranged in the receptacle (22) so as to actuate the impact piston (23).

19. The cold gas generator according to claim 18, wherein the pyrotechnical charge (25) is secured by a securing ring (26).

20. The cold gas generator according to claim 19, wherein the securing ring (26) is an elastic ring.

21. The cold gas generator according to claim 18, wherein the impact piston (23) has a piston jacket (27) and a piston bottom (28) defining an interior, partially enclosed piston chamber (29), wherein the pyrotechnical charge (25) projects into the piston chamber (29).

22. The cold gas generator according to claim 16, wherein the impact piston (23) and the pawl lever (21) each have a planar contact surface (30, 31) angled relative to one another in the rest state.

23. The cold gas generator according to claim 22, wherein the contact surface (30) of the impact piston (23) is smaller than a piston surface (32) of the impact piston (23).

24. The cold gas generator according to claim 16, wherein the impact piston (23) has a curved contact surface (30) rolling on the pawl lever (21).

25. The cold gas generator according to claim 24, wherein the contact surface (30) of the impact piston (23) is smaller than a piston surface (32) of the impact piston (23).

* * * * *